US009183982B2

(12) United States Patent
Moon

(10) Patent No.: US 9,183,982 B2
(45) Date of Patent: Nov. 10, 2015

(54) POWER-ELECTRONIC-TYPE FAULT CURRENT LIMITER USING MAGNETIC TURN-OFF PRINCIPLE

(71) Applicant: Young-hyun Moon, Seoul (KR)

(72) Inventor: Young-hyun Moon, Seoul (KR)

(*) Notice: Subject to any disclaimer, the term of this patent is extended or adjusted under 35 U.S.C. 154(b) by 0 days.

(21) Appl. No.: 14/368,535

(22) PCT Filed: Dec. 7, 2012

(86) PCT No.: PCT/KR2012/010620
§ 371 (c)(1),
(2) Date: Jun. 25, 2014

(87) PCT Pub. No.: WO2013/100429
PCT Pub. Date: Jul. 4, 2013

(65) Prior Publication Data
US 2014/0347153 A1 Nov. 27, 2014

(30) Foreign Application Priority Data

Dec. 26, 2011 (KR) ........................ 10-2011-0142152

(51) Int. Cl.
*H01F 27/28* (2006.01)
*H01F 17/00* (2006.01)
(Continued)

(52) U.S. Cl.
CPC .............. *H01F 27/402* (2013.01); *H01F 27/28* (2013.01); *H01F 27/34* (2013.01); *H01F 27/38* (2013.01); *H01F 29/14* (2013.01); *H01F 29/146* (2013.01); *H02H 9/021* (2013.01)

(58) Field of Classification Search
CPC ..... H01F 27/38; H01F 17/04; H01F 27/2823; H01F 5/04; H01F 27/245; H01F 27/2847; H01L 23/5227

USPC ......... 336/170, 177, 180, 192, 214, 215, 221, 336/222
See application file for complete search history.

(56) References Cited

U.S. PATENT DOCUMENTS

| | | | | | |
|---|---|---|---|---|---|
| 1,815,842 | A | * | 7/1931 | Gay | ................................ 307/18 |
| 2,455,791 | A | * | 12/1948 | Masciarelli | .................... 315/276 |
| 5,122,947 | A | * | 6/1992 | Hishiki | ............................ 363/61 |
| 7,227,438 | B2 | * | 6/2007 | Song et al. | ..................... 335/216 |
| 2010/0165532 | A1 | | 7/2010 | Park et al. | |

FOREIGN PATENT DOCUMENTS

KR  2010-0080197 A  7/2010

OTHER PUBLICATIONS

Ji-Seong, Kang et al., "Basic study on developing Power-SemiConductor-Type Fault Current Limiter based on Magnetic Turn-Off principle", Korean Electricity Journal, Jul. 20-22, 2011, pp. 174-175.

(Continued)

*Primary Examiner* — Tsz Chan
(74) *Attorney, Agent, or Firm* — Hauptman Ham, LLP

(57) ABSTRACT

The present invention provides a fault current limiter which can reduce an abnormal current, such as a fault current, in a power system through the magnetic turn-off which increases the reactance of an electric circuit by changing the magnetic circuit. The fault current limiter for limiting a current supplied through a power supply path, according to the present invention, includes: an iron core having three legs of which the upper and lower portions are connected to each other; a primary winding wound around each of the three legs of the iron core and having both ends connected to the power supply path; and a secondary winding wound around each of the three legs of the iron core and having both ends connected to each other through a first switching device.

10 Claims, 10 Drawing Sheets

(51) Int. Cl.
 *H01F 27/29* (2006.01)
 *H01F 27/24* (2006.01)
 *H01F 17/04* (2006.01)
 *H01F 27/40* (2006.01)
 *H01F 29/14* (2006.01)
 *H01F 27/34* (2006.01)
 *H02H 9/02* (2006.01)
 *H01F 27/38* (2006.01)

(56) References Cited

OTHER PUBLICATIONS

Ji-Seong Kang et al., "Solid-State Fault Current Limiter based on Magnetic Turn off Principle", Journal of ICEE, vol. 4, No. 2, pp. 95-101, 2014.

* cited by examiner

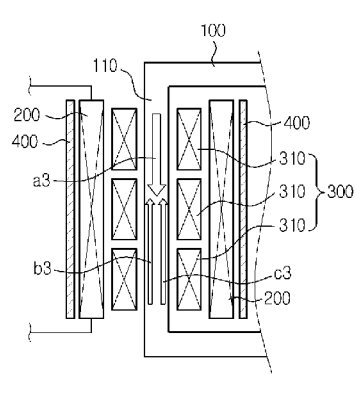
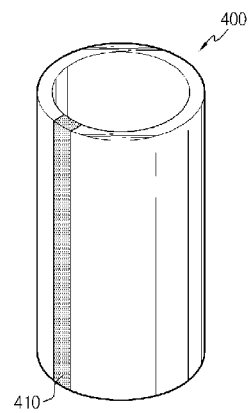
FIG. 5  FIG. 6
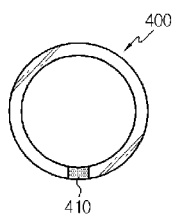
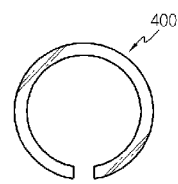
FIG. 7A  FIG. 7B

POWER-ELECTRONIC-TYPE FAULT CURRENT LIMITER USING MAGNETIC TURN-OFF PRINCIPLE

TECHNICAL FIELD

The present application is a U.S. National Phase of International Application No. PCT/KR2012/010620 filed on Dec. 7, 2012, which claims priority of Korean Patent Application No. 10-2011-0142152 filed on Dec. 26, 2011, which is incorporated herein by reference in its entirety.

Exemplary embodiments of the present invention relate to a fault current limiter based on a three-phase AC system, which increases the reactance of a primary circuit through the magnetic turn-off principle so as to reduce a fault current in a limiter circuit having a transformer structure, thereby easily performing circuit interruption when a fault occurs.

BACKGROUND ART

On a power supply path including a power system, a fault may occur due to various reasons. The fault may indicate that a ground fault or short circuit occurs, under the supposition that the system is a circuit.

Representative examples of a fault current limiter may include a superconducting fault current limiter using a high-temperature superconducting element and a solid-state fault current limiter using a power-electronic element. However, since the two fault current limiters require a high cost, there is a limitation in increasing the capacity.

Recently, however, as the power system becomes more and more complex, the magnitude of a fault current in the power system has gradually increased. Thus, there is an urgent demand for a fault current limiter capable of limiting a fault current.

DISCLOSURE

Technical Problem

The present invention has been made in view of the above problems, and it is an object of the present invention to provide a magnetic turn-off fault current limiter (MTO-FCL) which is capable of obtaining a magnetic turn-off effect through on/off control for a secondary winding when a fault occurs in a power system, thereby rapidly and accurately reducing the magnitude of a fault current.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with one aspect of the present invention, there is provided a fault current limiter for limiting a current supplied through a power supply path. The fault current limiter may include: an iron core having three legs of which the upper and lower portions are connected to each other; a primary winding wound around each of the three legs of the iron core and having both ends connected to the power supply path; and a secondary winding wound around each of the three legs of the iron core and having both ends connected to each other through a switching device.

Advantageous Effects

According to the embodiments of the present invention, when a fault occurs in a power supply path such as a power system such that an abnormal current flows, the magnetic circuit may be physically changed through the on/off control for the switching devices. Then, reactance may be increased to effectively reduce an abnormal current such as a fault current.

In particular, since the reactance increased by magnetic switching is higher than the impedance of a typical generator or line impedance, the magnitude of a fault current may be considerably reduced.

Thus, when a fault current occurs due to an accident in the power system, a break current of a circuit breaker may be effectively reduced. Thus, a high fault current may be blocked through a circuit breaker having a small capacity. Furthermore, the manufacturing cost for the circuit breaker may be reduced, and the replacement cost for an existing circuit breaker may be reduced.

In accordance with the embodiment of the present invention, the operating speed of the fault current limiter for limiting a fault current may be improved to effectively perform a reclosing operation.

Furthermore, when the fault current limiter according to the embodiment of the present invention is applied, it is possible to develop various application models suitable for situations of the system.

DESCRIPTION OF DRAWINGS

The above and other objects, features and other advantages of the present invention will be more clearly understood from the following detailed description taken in conjunction with the accompanying drawings, in which:

FIG. 5 schematically illustrates the configuration of the fault current limiter of FIGS. 4A and 4B in a normal state and a flow of magnetic flux in the fault current limiter;

FIG. 6 schematically illustrates the structure of a conductor tube of the fault current limiter according to the embodiment of the present invention;

FIGS. 7A and 7B are a top view of the conductor tube of FIG. 6.

BEST MODE FOR INVENTION

Hereafter, exemplary embodiments of the present invention will be described below in more detail with reference to the accompanying drawings. The terms or words used in the present specification and claims must not be limited to typical or dictionary meanings, but analyzed as meanings and concepts which coincide with the spirit of the present invention, based on the principle that the present inventor can properly define the concepts of the terms in order to describe the invention in the best way.

Thus, configurations illustrated in the embodiments and drawings of the present invention are only examples, and do not necessarily represent the spirit of the present invention. Thus, various equivalents and modifications capable of replacing the configurations may be provided at the time of filing the present application.

Figures 1A, 1B:
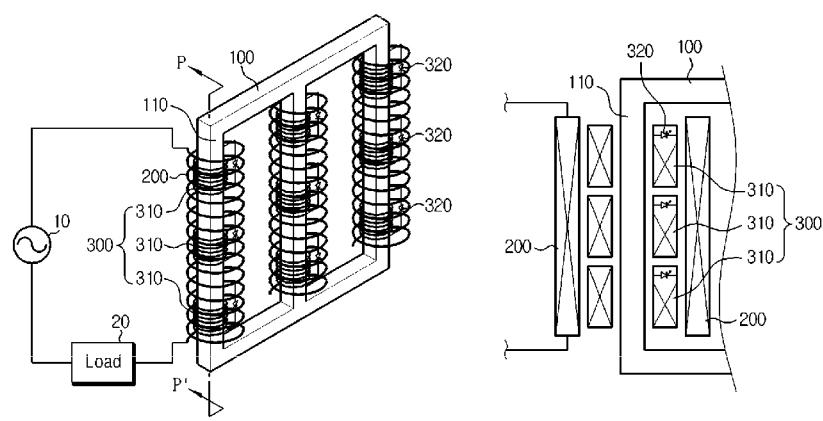
FIGS. 1A and 1B schematically illustrate the configuration of a fault current limiter according to an embodiment of the present invention.

FIGS. 1A and 1B schematically illustrate the configuration of a fault current limiter according to an embodiment of the present invention. More specifically, FIG. 1A is a schematic perspective view of the fault current limiter, and FIG. 1B is a schematic cross-sectional view of the fault current limiter, taken along line P-P' of FIG. 1A, when seen from the front. In FIG. 1B, each winding (coil) is represented by X in a rectangle, for convenience of description. In the following drawings, each winding will be represented in the same manner.

Referring to FIGS. 1A and 1B, the fault current limiter according to the embodiment of the present invention is a fault current limiter based on a three-phase AC system, and includes an iron core 100 and primary and secondary windings 200 and 300 connected to a system.

The iron core 100 includes three legs 110 of which the upper and lower portions are connected to each other. As illustrated in FIGS. 1A and 1B, the iron core 100 includes three stick-shaped legs 110 extended in the longitudinal direction thereof, the upper portions of the three legs 110 of the iron core 100 are connected to each other, and the lower portions of the three legs 110 are also connected to each other. The reason that the iron core 100 includes the three legs 110 is that power supply of the power system is performed in a three phase manner.

Since the upper and lower portions of the three legs 110 of the iron core 100 are connected to each other, the iron core 100 forms a magnetic path, that is, a magnetic circuit. The iron core 100 may be formed of iron which is used in a power transformer or rotating electrical machine so as to form a magnetic circuit, and made by overlapping thin silicon steel plates.

In FIGS. 1A and 1B, the iron core 100 is formed in such a shape that a figure-eight structure is turned on the side. However, this is only an example, and the iron core 100 may be implemented in various shapes. For example, the iron core 100 may be formed in a cylindrical shape or triangular prism shape having three legs 110.

The primary winding 200 is wound around each of the three legs 110. That is, three primary windings 200 are provided to be wound around the three legs 110 of the iron core 100, respectively. Both ends of the primary winding 200 are connected in series to the power system. That is, as illustrated in FIGS. 1A and 1B, the primary winding 200 is provided on the power supply path, and has one end connected to a source 10 and the other end connected to a load 20. In particular, since the fault current limiter according to the embodiment of the present invention may be provided in a power system, the primary winding 200 may be provided for a power transmission line of the power system.

FIG. 1B illustrates that only the primary winding 200 provided on one leg 110 is connected to the source 10 and the load 20, for convenience of description. However, the primary windings 200 provided on the other legs 110 may also be connected to the power 10 and the load 20. In the case of three-phase power having A, B, and C phases, the primary windings 200 provided on the three legs 110 may be connected to the A, B, and C phases, respectively.

The secondary windings 300 are wound around the three legs 110 of the iron core 110, like the primary windings 200. However, each of the secondary windings 300 has both ends connected to each other through a switching device 320. Hereafter, the switching device 320 will be referred to as a first switching device. Thus, when the first switching device 320 is turned on, the secondary winding 300 is shorted, and when the first switching device 320 is turned off, the secondary winding 300 is opened. Therefore, when the first switching device 320 is turned on, the secondary winding 300 may function as a winding, that is, have a function of generating magnetic flux. However, when the first switching device 320 is turned off, the secondary winding 300 cannot function as a winding.

The switching device is an element which serially connects a power electronic element such as a thyristor to a winding so as to control on/off of the power electronic element, and controls magnetic flux generated through the winding. Thus, the winding circuit may be shorted and connected through the switching device so as to generate magnetic flux, or opened through the switching device such that the winding cannot function.

As illustrated in FIGS. 1A and 1B, the secondary winding 300 may be wound between the primary winding 200 and the leg 110. Alternatively, the secondary winding 300 may be positioned outside the primary winding 200 so as to be wound around the leg 110.

Desirably, when an abnormal current flows through the power supply path, the first switching device 320 of the secondary winding 300 is turned off. That is, the first switching device 320 of the secondary winding 300 is turned on while a normal current flows through the power supply path of the power system, but turned off when an abnormal current flows through the power supply path.

At this time, the first switching device 320 may be turned off when an instantaneous value of voltage or current is zero or close to zero. Then, it is possible to prevent the burnout of the first switching device 320 which may be caused by a backward voltage.

Furthermore, as illustrated in FIGS. 1A and 1B, the secondary winding 300 may include a plurality of unit windings 310, and the plurality of unit windings 310 may have both ends connected to each other through the first switching devices 320, respectively. As such, when the secondary winding 300 includes the plurality of unit windings 310, the magnitude of a current flowing through the secondary winding 300 and a withstanding voltage applied to the first switching device 320 may be reduced.

The first switching device 320 of the secondary winding 300 may be implemented with a thyristor, as illustrated in FIGS. 1A and 1B. However, the present invention is not limited to a thyristor serving as the first switching device 320, but various switching devices other than a thyristor may be applied to the present invention.

In FIG. 1B, the thyristor is represented by X inside a rectangle positioned in the right side of the leg 110 of the iron core, in order to illustrate that both ends of the secondary winding 300 are connected to each other through the first switching device 320. Hereafter, the thyristor will be represented in the same manner.

The secondary winding 300 serves to offset the magnetic flux formed through the primary winding 200. That is, when a current flows through the primary winding 200 provided on the power supply path, magnetic flux is formed by the primary winding 200, and most of the magnetic flux flows along the magnetic path formed through the iron core 100. The secondary winding 300 forms magnetic flux in the opposite direction of the magnetic flux formed through the primary winding 200.

Figure 2:
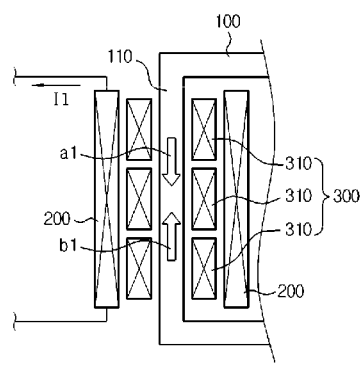
FIG. 2 schematically illustrates the configuration of the fault current limiter of FIG. 1 in a normal state and a flow of magnetic flux in the fault current limiter.

FIG. 2 schematically illustrates a flow of magnetic flux in the configuration of FIG. 1B in a normal state. FIG. 2 illustrates only one leg of the three legs 110 of the iron core 100 provided in the fault current limiter. However, since the primary windings 200 provided on the three legs 110 are connected to the three-phase power, the other two windings may be configured in the same manner.

Referring to FIG. 2, since the first switching device 320 of the secondary winding 300 is turned on in a normal state, the secondary winding 300 has a short-circuit state in which both ends thereof are connected. In particular, when the secondary winding 300 includes the plurality of unit windings 310 as illustrated in FIG. 2, the plurality of first switching devices 320 provided for the respective unit windings 310 may be turned on in a normal state such that the unit windings 310 function as windings. In order to indicate such a state, FIG. 2 does not separately illustrate the switching devices for the secondary winding 300. Thus, when a current I1 flows through the primary winding 200, magnetic flux is formed in an upward direction indicated by an arrow b1 through the secondary winding 300 in a short-circuit state, under the supposition that magnetic flux is formed in a downward direction indicated by an arrow a1 through the primary winding 200. Thus, when the current I1 flows through the primary winding 200 in the normal state, the magnetic flux formed through the primary winding 200 may be offset by the magnetic flux formed through the secondary winding 300. In the normal state, the fault current limiter maintains extremely small total reactance. Therefore, the fault current limiter has almost no influence on the power system.

Figure 3:
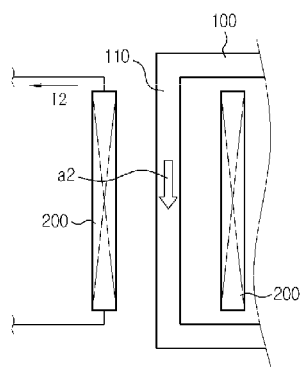
FIG. 3 schematically illustrates the configuration of FIG. 2 and a flow of magnetic flux, when an abnormality occurs in a power supply path.

FIG. 3 schematically illustrates the configuration of FIG. 2 and a flow of magnetic flux, when an abnormality occurs in the power supply path.

Referring to FIG. 3, when an abnormal current flows through the power supply current, the first switching device 320 of the secondary winding 300, such as a thyristor, is turned off. In particular, as illustrated in FIG. 3, when the secondary winding 300 includes the plurality of unit windings 310, all of the first switching devices 320 provided for the respective unit windings 310 may be turned off in case where an abnormality occurs. FIG. 3 does not illustrate the secondary winding 300, in order to indicate that the secondary winding 300 does not function as a winding due to the turn-off of the first switching devices 320. Thus, when an abnormal current I2 flows through the primary winding 200, magnetic flux cannot be formed through the secondary winding 300 in the turn-off state, even though magnetic flux is formed in a downward direction indicated by an arrow a2 through the primary winding 200. Therefore, when an abnormal current flows through the power supply path, the magnetic flux of the primary winding 200 flows through the iron core 100, because there is no element to offset the magnetic flux formed through the primary winding 200. Then, the reactance of the fault current limiter significantly increases according to the flow of the magnetic flux. Thus, since the current I2 flowing through the power supply path rapidly decreases, the magnitude of an abnormal current such as a fault current may be effectively reduced.

Figures 4A, 4B:
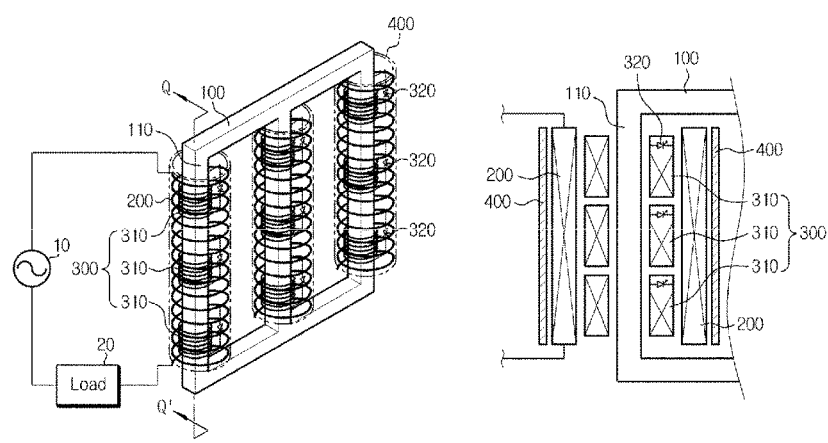
FIGS. 4A and 4B schematically illustrate the configuration of a fault current limiter according to another embodiment of the present invention.

FIGS. 4A to 4B schematically illustrate the configuration of a fault current limiter according to another embodiment of the present invention. More specifically, FIG. 4A is a schematic perspective view of the fault current limiter, and FIG. 4B is a schematic cross-sectional view of the fault current limiter, taken along line Q-Q' of FIG. 4A, when seen from the front.

As illustrated in FIGS. 4A and 4B, the fault current limiter according to the embodiment of the present invention may further include a conductor tube 400. In FIG. 4A, the conductor tube 400 is represented by a dotted line, in order to indicate that the primary and secondary windings 200 and 300 are provided inside the conductor tube 400.

The conductor tube 400 is a winding of which the turn number is 1. Furthermore, the conductor tube 400 may generate magnetic flux as a shorted winding, like the secondary winding 300.

Referring to FIGS. 4A and 4B, the conductor tube 400 is positioned outside the primary and secondary windings 200 and 300 so as to surround the leg 110 of the iron core 100. FIG. 4A illustrates that the conductor tube 400 has a cylindrical shape. However, this is only an example, and the conductor tube 400 may have various shapes such as a rectangular tube.

The conductor tube 400 is formed of a conductive material. Desirably, the conductor tube 400 may be formed of copper.

Since the conductor tube 400 is formed of a conductive material, the conductor tube 400 may be considered as a winding which is wound one time around the leg 110 of the iron core 100. Thus, the conductor tube 400 may form magnetic flux in a direction to offset the magnetic flux formed by the primary winding 200.

FIG. 5 schematically illustrates a flow of magnetic flux in the configuration of FIG. 4B in a normal state.

Referring to FIG. 5, the first switching device 320 of the secondary winding 300 is turned on in a normal state. At this time, when the secondary winding 300 includes a plurality of unit windings 310, all of the first switching devices 320 provided for the respective unit windings 310 may be turned on. Thus, the secondary winding 300 may be shorted so as to function as a winding, that is, an inductor. Therefore, when a current I3 flows through the primary winding 200, magnetic flux is formed in an upward direction indicated by an arrow b3 through the secondary winding 300 in the short-circuit state, under the supposition that magnetic flux is formed in a downward direction indicated by an arrow a3 through the primary winding 200. Furthermore, since the conductor tube 400 can function as one winding, magnetic flux is formed in the upward direction indicated by an arrow c3 through the conductor tube 400. Thus, when the current I3 flows through the primary winding 200 in the normal state, the magnetic flux formed through the primary winding 200 may be offset by the magnetic fluxes formed through the secondary winding 300 and the conductor tube 400. Therefore, since the entire reactance of the fault current limiter in the normal state may be maintained at a very small value close to zero, the fault current limiter has almost no influence on the power system.

Desirably, the conductor tube 400 may include a separation piece which is separably attached to the conductor tube 400. When the separation piece is separated from the conductor tube 400, no magnetic field is formed by the conductor tube 400.

FIG. 6 schematically illustrates the structure of the conductor tube 400 according to the embodiment of the present invention. FIGS. 7A and 7B are top views of the conductor tube 400 of FIG. 6.

Referring to FIG. 6, the conductor tube 400 may have a tube-shaped body, and include a separation piece 410 which may be separated from the tube-shaped body. The separation piece 410 may form a part of the conductor tube 400, and may be separated from the conductor tube 400. In particular, when the separation piece 410 is separated from the conductor tube 400, no magnetic field may be formed by the conductor tube 400.

FIG. 7A is a top view of the conductor tube 400 in a state where the separation piece 410 forms a part of the conductor tube 400, and FIG. 7B is a top view of the conductor tube 400 in a state where the separation piece 410 is separated from the conductor tube 400. As illustrated in FIG. 7A, when the separation piece 410 is attached to the conductor tube 400, the conductor tube 400 may be considered as a winding which is wound one time around the iron core 100. Thus, as indicated by the arrow c3 of FIG. 5, magnetic flux may be formed through the conductor tube 400. As illustrated in FIG. 7B, however, when the separation piece 410 is separated from the conductor tube 400, the conductor tube 400 is opened so as not to form magnetic flux.

Desirably, when an abnormal current flows through the power supply path, the separation piece 410 may be separated from the conductor tube 400 after the first switching device 320 is turned off. That is, as described above in the embodiment of FIG. 3, when an abnormal current flows through the power supply path, the first switching device 320 of the secondary winding 300 may be turned off, in order to increase the entire reactance of the fault current limiter. The separation piece 410 may be separated from the conductor tube 400 after the first switching device 320 of the secondary winding 300 is turned off.

In particular, when the secondary winding 300 includes a plurality of unit windings 310 as described in the embodiment of FIG. 5, the separation piece 410 may be separated from the conductor tube 400 after all of the first switching devices 320 provided for the respective unit windings 310 are turned off. When an abnormal current flows through the power supply path, the first switching devices 320 provided for the respective unit windings 310 are turned off. At this time, since the operation of the first switching device 320 is performed according to an electrical signal, the plurality of first switching devices 320 may not be turned off at the same time. That is, a time interval may exist between the off operations of the first switching devices 320 provided for the respective unit windings 310. In this case, however, a high electromotive force may be induced to apply high-voltage stress to a first switching device 320 which is turned off later, because the number of unit windings 310 forming the secondary winding 300 decreases. In particular, since only one unit winding 310 of the secondary winding 300 remains for the first switching device 320 which is finally turned off, larger high-voltage stress may be induced into the first switching device 320.

However, when the conductor tube 400 is provided as described above, the conductor tube 400 may reduce high-voltage stress induced into the first switching device 320 which is turned off later. That is, since the conductor tube 400 may function as one winding in a state where the separation piece 410 is not separated, the high-voltage stress induced into the first switching device 320 may be significantly reduced through the conductor tube 400, even when there remains one first switching device 320 which is to be turned off.

FIGS. 8 to 11 sequentially illustrate the change in flow of magnetic flux in the configuration of the fault current limiter of FIG. 5 when an abnormality occurs in the power supply path. In FIGS. 8 to 11, when each of the unit windings 310 of the secondary winding 300 or the conductor tube 400 is opened so as not to function as a winding, the unit winding 310 or the conductor tube 400 is not illustrated, for convenience of description.

When an abnormality such as a fault current occurs in the power supply path, the first switching device 320 of the secondary winding 300 is first turned off. However, when the secondary winding 300 includes the plurality of unit windings 310 and the first switching devices 320 are provided for the respective unit windings 310, the first switching devices 320 of the unit windings 310 may not be turned off at the same time. For example, referring to the embodiment of FIGS. 8 to 10, when the secondary winding 300 includes three unit windings 310 and all of the first switching devices 320 provided for the respective unit windings 310 are intended to be turned off, there may exist a difference between the turn-off times of the first switching devices 320. In such a case, a high induced electromotive force may be induced into the first switching device 320 of the last unit winding 310 as illustrated in FIG. 9, thereby causing high-voltage stress. According to the embodiment of the present invention, however, the induction of high induced electromotive force into the first switching device 320 of the last unit winding 310 may be prevented because the conductor tube 400 is in a short-circuit state.

Figure 10:
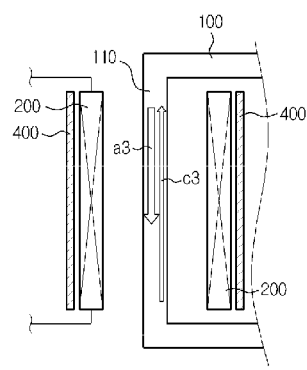
Figure 11:
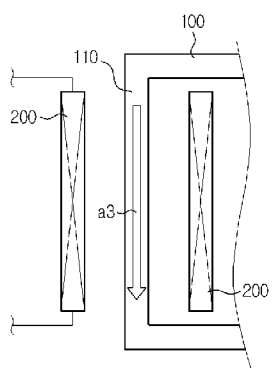

When all of the first switching devices 320 of the secondary winding 300 are turned off as illustrated in FIG. 10, magnetic flux a3 formed through the primary winding 200 may be offset by magnetic flux c3 formed through the conductor tube 400. Then, when the separation piece 410 of the conductor tube 400 is separated, the conductor tube 400 cannot function as a coil. As illustrated in FIG. 11, most of the magnetic flux formed through the primary winding 200 may not be offset, but smoothly flow along the iron core 100. Thus, the reactance of the fault current limiter may be significantly increased, and the magnitude of an abnormal current flowing through the power supply path may be considerably reduced. Therefore, when the above-described embodiment is applied, it is possible to not only prevent a fault current from flowing through the power system, but also prevent the first switching devices 320 of the secondary winding 300 from being destroyed or damaged by a high induced electromotive force.

Figure 8:
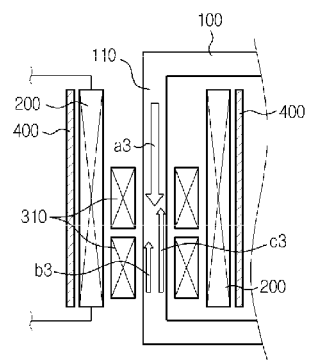
FIGS. 8 to 11 sequentially illustrate the change in flow of magnetic flux in the configuration of the fault current limiter of FIG. 5 when an abnormality occurs in the power supply path.
Figure 9:
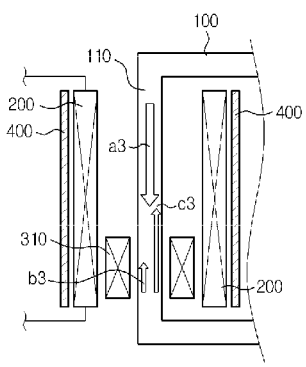

In the embodiment of FIGS. 8 to 10, the secondary winding 300 includes three unit windings 310. However, the number of unit windings 310 forming the secondary winding 300 is only an example, and the secondary winding 300 may include various numbers of unit windings 310.

Desirably, the body of the conductor tube 400 excluding the separation piece 410 may be formed of hard-drawn copper, and the separation piece 410 may be formed of annealed copper. As the conductor tube 400 is formed of hard-drawn copper, the conductor tube 400 may secure structural stability. However, as the separation piece 410 is formed of annealed copper, the separation piece 410 may not only be separated from the body of the conductor tube 400, but also closely attached to the body of the conductor tube 400.

Figure 12:
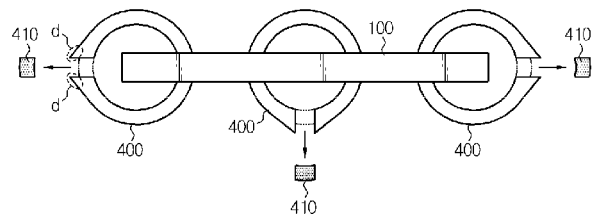
FIG. 12 is a top view of the fault current limiter, illustrating that separation pieces are separated from the conductor tubes in the configuration of the fault current limiter of FIGS. 4A and 4B.

FIG. 12 is a top view of the fault current limiter, illustrating that the separation pieces 410 are separated from the conductor tubes 400 in the configuration of the fault current limiter of FIGS. 4A and 4B. FIG. 12 does not illustrate the primary and secondary windings 200 and 300 surrounding the iron core legs 110 inside the conductor tubes 400, for convenience of description.

As indicated by an arrow in FIG. 12, the separation pieces 410 may be separated in lateral directions of the conductor tubes 400. In this case, the separation piece 410 may be separated from a conductor tube 400 wound around an iron core leg 110 in such a direction that the separation piece 410 does not interfere with another conductor tube 400 wound around another iron core leg 110 and another separation piece 410 separated from the another conductor tube 400. When the separation piece 410 is separated from the conductor tube 400, the conductor tube 400 may be opened so as not to form magnetic flux.

More desirably, a part of the conductor tube 400, which is contacted with the separation piece 410 as indicated by d in FIG. 12, may have a larger thickness than the other part of the conductor tube 400. In this case, when the separation piece 410 is separated from the conductor tube 400, the occurrence of spark may be prevented.

The separation of the separation piece 410 as illustrated in FIG. 12 may be performed through a hydraulic operating force, but the present invention is not limited to the separation structure for the separation piece 410. Namely, various mechanical operating methods disclosed at the time of filing the present application may be applied to the separation structure for the separation piece 410.

Figures 13A, 13B:
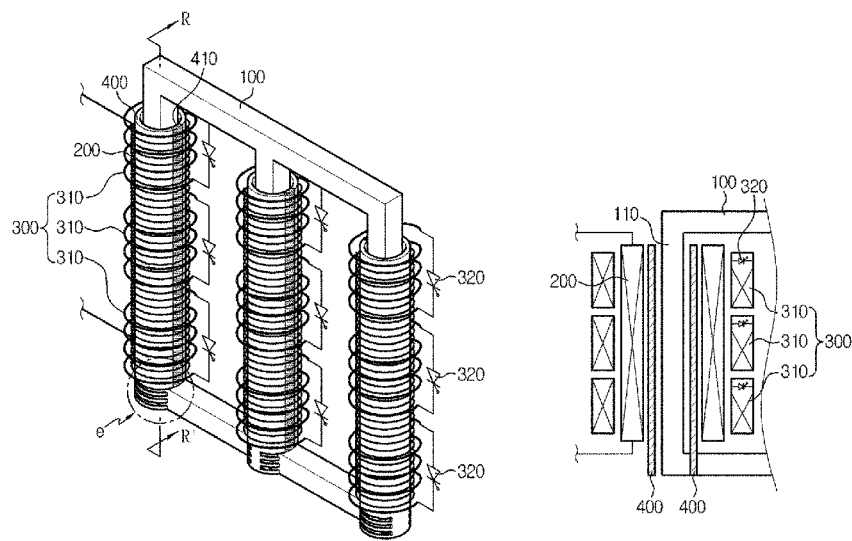
FIGS. 13A and 13B schematically illustrate the configuration of a fault current limiter according to another embodiment of the present invention.

FIGS. 13A and 13B schematically illustrate the configuration of a fault current limiter according to another embodiment of the present invention. More specifically, FIG. 13A is a schematic perspective view of the fault current limiter, and FIG. 13B is a schematic cross-sectional view of the fault current limiter, taken along line R-R' of FIG. 13A, when seen from the front.

Referring to FIGS. 13A and 13B, the fault current limiter according to the embodiment of the present invention may further include a conductor tube 400, like the fault current limiter of FIGS. 4A and 4B. The role, function, and material of the conductor tube 400 are similar to those of the conductor tube 400 illustrated in FIGS. 4A and 4B. Thus, the contents which may be applied to the present embodiment among the contents described in the embodiment of FIGS. 4 to 11 are omitted herein. The following descriptions will be focused on differences from the embodiment of FIGS. 4 to 11.

As illustrated in FIGS. 13A and 13B, the conductor tube 400 is positioned inside primary and secondary windings 200 and 300 so as to surround a leg 110 of the iron core 100. The conductor tube 400 has a structure in which a lower part thereof is engaged with the iron core 100 (hereafter, referred to as an engagement structure), as indicated by a portion e of FIG. 13A. The engagement structure will be described in detail with reference to FIGS. 14 to 17.

Figure 14:
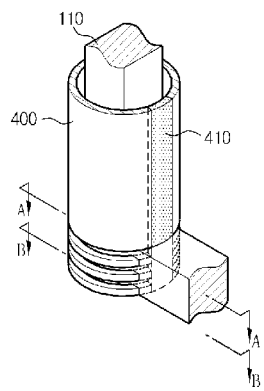
FIG. 14 is an expanded diagram of a portion e of FIGS. 13A and 13B.
Figure 15:
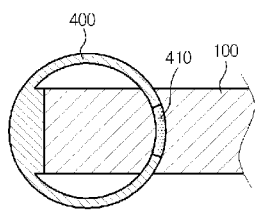
FIG. 15 is a cross-sectional view taken along line A-A' of FIG. 14.
Figure 16:
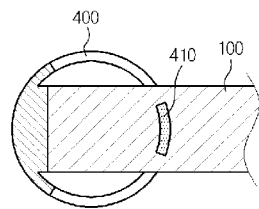
FIG. 16 is a cross-sectional view taken along line B-B' of FIG. 14.
Figure 17:
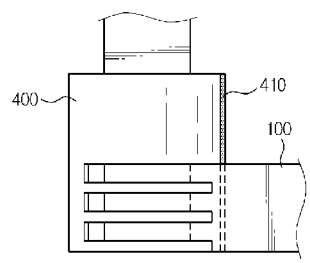
FIG. 17 is a front view of FIG. 14.

FIG. 14 is an expanded diagram of the portion e of FIG. 13A. FIG. 15 is a cross-sectional view taken along line A-A' of FIG. 14. FIG. 16 is a cross-sectional view taken along line B-B' of FIG. 14. FIG. 17 is a front view of FIG. 14. Referring to FIGS. 14 to 17, the lower part of the conductor tube 400 is formed in a comb-teeth shape so as to pass through the iron core 100 in a horizontal direction. That is, when the conductor tube 400 passes through the iron core 100 in the horizontal direction, the comb teeth of the conductor tube 400 pass through the iron core 100. In particular, FIG. 15 illustrates the cross-section of the comb teeth of the conductor tube 400, passing through the iron core 100 in the horizontal direction, and FIG. 16 illustrates the cross-section of the lower part of the conductor tube 400 excluding the comb teeth. Since the conductor tube 400 and the iron core 100 are sufficiently insulated from each other, the conductor tube 400 and the iron core 100 are not electrically coupled to each other. Furthermore, since the conductor tube 400 and the iron core 100 are coupled through the comb-shaped engagement structure, the magnetic path formed in the iron core 100 may not be disconnected but maintained, while the lower part of the conductor tube 400 passes through the iron core 100 in the horizontal direction. Thus, although the conductor tube 400 and the iron core 100 are coupled to each other through the engagement structure, magnetic flux may smoothly flow along the iron core 100. Furthermore, as the magnetic flux smoothly flows, the reactance of the primary circuit may be significantly increased. Such a state of the fault current limiter may be referred to as a magnetic turn-off state.

The conductor tube 400 of FIG. 14 may be formed of a conductive material, like the conductor tube 400 of FIGS. 4A and 4B. Desirably, the conductor tube 400 may be formed of copper. The conductor tube 400 may be considered as a winding which is wound one time around the iron core 110. Thus, when magnetic flux is formed through the primary winding 200, the conductor tube 400 forms magnetic flux in the opposite direction of the magnetic flux formed through the primary winding 200, like the embodiment of FIG. 5. Thus, when a normal current flows through the primary winding 200, the magnetic flux formed through the primary winding 200 may be offset by the magnetic flux formed through the secondary winding 300 and the conductor tube 400.

The conductor tube 400 may include a separation piece 410 which may be separated from the conductor tube 400, like the conductor tube 400 of FIGS. 4A and 4B. When the separation piece 410 is separated from the conductor tube 400, no magnetic field may be formed by the conductor tube 400.

In particular, when an abnormal current flows through the power supply path, the separation piece 410 may be separated from the conductor tube 400 after the first switching devices 320 are turned off That is, when the secondary winding 300 includes a plurality of unit windings 310 and the first switching devices 320 are provided for the respective unit windings 310, the separation piece 410 may be separated from the conductor tube 400 after all of the first switching devices 320 provided for the respective unit windings 310 are turned off. Then, it is possible to prevent excessive high-voltage stress from being applied to a first switching device 320 which is turned off later.

When the separation piece 410 is separated from the conductor tube 400, the conductor tube 400 may be opened as illustrated in FIG. 7B. Then, since the conductor tube 400 cannot function as a winding, no magnetic flux is formed by the conductor tube 400. Thus, the magnetic flux formed through the primary winding 200 may not be offset, but smoothly flow along the iron core 100. Therefore, the reactance of the fault current limiter may be significantly increased, and the magnitude of the abnormal current may be considerably reduced.

The separation piece 410 of the conductor tube 400 may be formed of annealed copper, and the other part of the conductor tube 400 may be formed of hard-drawn copper.

Figure 18A:
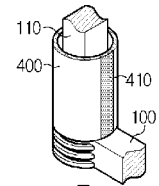
FIGS. 18A to 18C sequentially illustrate that a separation piece is separated from a conductor tube in the fault current limiter of FIGS. 13A and 13B.
Figure 18B:
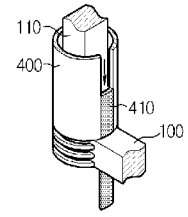
Figure 18C:
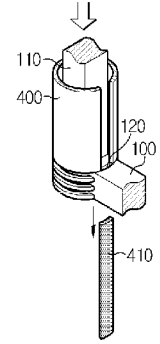

FIGS. 18A to 18C sequentially illustrate that the separation piece 410 is separated from the conductor tube 400 in the fault current limiter of FIGS. 13A and 13B.

As illustrated in FIGS. 18A to 18C, the separation piece 410 may be separated from the part of the conductor tube 400, coupled to the iron core 100 through the engagement structure, in a downward direction from the conductor tube 410. As illustrated in FIG. 18C, the iron core 100 may have a hole 120 formed at the bottom thereof, through which the separation piece 410 escapes, in order to separate the separation piece 410 downward from the conductor tube 400, that is, downward from the fault current limiter. Since the hole 120 of the iron core 100 has a size equal to or larger than the separation piece 410, the separation piece 410 may escape downward through the hole 120. When the separation piece 410 is separated downward from the conductor tube 400, a counter electromotive force and spark may not be generated. More specifically, when the separation piece 410 is separated from the conductor tube 400, a current induced through the magnetic flux, which is formed through the primary winding 200 and flows along the iron core 100, flows through the conductor tube 400. Then, the magnetic flux formed through the primary winding 200 may flow along the iron core 100. When the separation piece 410 of the conductor tube 400 through which a current flows is moved downward in a state where the magnetic flux flows, a force is applied downward along the movement direction of the separation piece 410. Furthermore, the current flowing through the primary winding 200 and the current induced in the conductor tube 400 have opposite directions to each other, and a repulsive force acts between the currents flowing in the opposite directions. Thus, when the separation piece 410 is moved downward, the separation piece 410 may be easily separated from the conductor tube 400 without a repulsive force. Furthermore, when the separation piece 410 of the conductor tube 400 through which the current induced by the magnetic flux of the iron core 100 flows is separated downward, the current flowing through the separation piece 410 disappears. Thus, no spark occurs.

Therefore, when the conductor tube 400 and the iron core 100 are coupled to each other through the engagement structure and the separation piece 410 is separated downward from the conductor tube 400, the separation of the separation piece 410 may be easily performed, and no spark may occur. The process of increasing the reactance of the fault current limiter without spark is referred to as the magnetic turn-off principle.

In the embodiment of FIGS. 13A and 13B, the primary winding 200 is positioned inside the secondary winding 300 so as to be wound around the iron core leg 110. However, the primary winding 200 may be positioned outside the secondary winding 300 so as to surround the iron core 110.

Figures 19A, 19B:
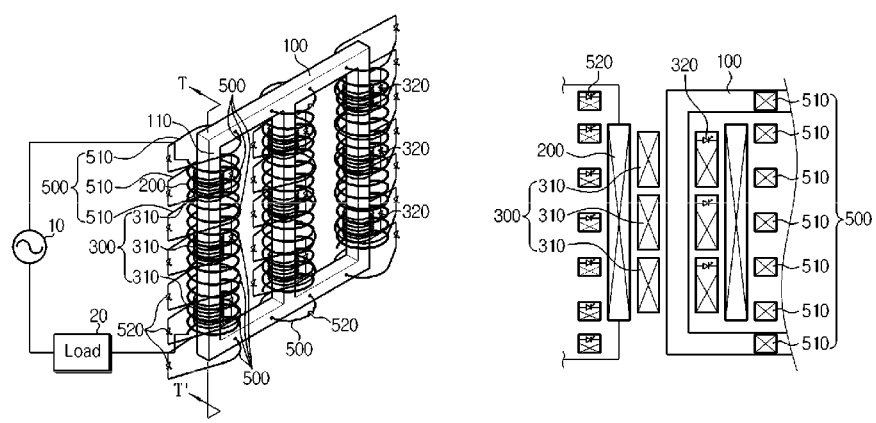
FIGS. 19A and 19B schematically illustrate the configuration of a fault current limiter according to another embodiment of the present invention.

FIGS. 19A and 19B schematically illustrate the configuration of a fault current limiter according to another embodiment of the present invention. More specifically, FIG. 19A is a schematic perspective view of the fault current limiter, and FIG. 19B is a cross-sectional view of the fault current limiter, taken along line T-T' of FIG. 19A, when seen from the front.

Referring to FIGS. 19A and 19B, the fault current limiter according to the embodiment of the present invention may further include a tertiary winding 500.

As illustrated in FIGS. 19A and 19B, the tertiary winding 500 may include a plurality of unit windings 510. FIGS. 19A and 19B illustrate that one unit winding 510 is wound one time around an iron core leg, but the unit winding 510 may be wound two or more times around the iron core leg. Furthermore, FIGS. 19A and 19B illustrate that the tertiary winding 500 is wound outside the primary and secondary windings 200 and 300, but the tertiary winding 500 may be wound inside the primary and secondary windings 200 and 300.

In FIGS. 19A and 19B, the tertiary winding 500 wound around one leg of three iron core legs includes 11 unit windings 510. However, the number of unit windings 510 of the tertiary winding 500 is only an example. The present invention is not limited to the number of unit windings 510, but the number of unit windings 510 of the tertiary winding 500 may be set in various manners.

The tertiary winding 500 has both ends connected to each other through a switching device 520. Hereafter, the switching device 520 is referred to as a second switching device. That is, each of the unit windings 510 forming the tertiary winding 500 has both ends connected to each other through the second switching device 520.

Thus, when a second switching device 520 is turned on, a corresponding unit winding 510 is shorted, and when the second switching device 520 is turned off, the unit winding 510 is opened. Therefore, when the second switching device 520 is turned on, the unit winding 510 may function as a winding. However, when the second switching device 520 is turned off, the unit winding 510 may not function as a winding.

Desirably, among the plurality of unit windings 510 of the tertiary winding 500, one or more unit windings 510 may pass through the iron core. For example, as illustrated in FIGS. 19A and 19B, when the tertiary winding 500 for one iron core leg includes 11 unit windings 510, three unit windings 510 positioned at the uppermost part and three windings 510 positioned at the lowermost part may pass through the iron core. Furthermore, among the unit windings 510 of the tertiary winding 500, five or less unit windings or seven or more unit windings 510 may pass through the iron core.

The second switching device 520 of the tertiary winding 500 may be implemented with a thyristor as illustrated in FIGS. 19A and 19B. However, the second switching device 520 according to the embodiment of the present invention is not limited to a thyristor, but may include various switching devices.

When an abnormal current flows through the power supply path, the second switching devices 520 of the tertiary winding 500 may be turned off. That is, while a normal current flows through the power supply path without an abnormal current flowing through the power supply path, the second switching devices 520 of the tertiary winding 500 may be turned on. When the second switching devices 520 are turned on, the tertiary winding 500 may function as a winding. Thus, the tertiary winding 500 may form magnetic flux in a direction to offset the magnetic flux formed through the primary winding 200, like the conductor tube 400 of FIG. 4A, 4B or 13.

At this time, the second switching device 520 may be turned off when an instantaneous value of a voltage or current is zero or close to zero. Then, it is possible to prevent the burnout of the second switching device 320, which may be caused by a backward voltage.

Figure 20:
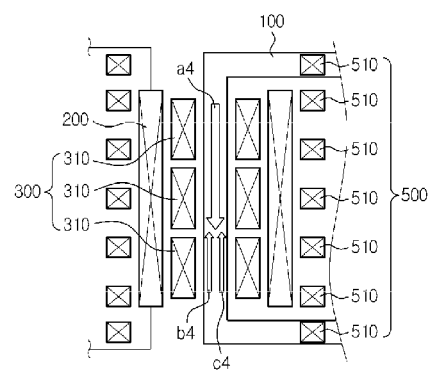
FIG. 20 schematically illustrates a flow of magnetic flux in the configuration of the fault current limiter of FIGS. 19A and 19B in a normal state.

FIG. 20 schematically illustrates a flow of magnetic flux in the configuration of FIG. 19B in a normal state.

Referring to FIG. 20, all of the first switching devices 320 of the secondary winding 300 and all of the second switching devices 520 of the tertiary winding 500 are turned on in a normal state. Therefore, both of the secondary winding 300 and the tertiary winding 500 may be shorted to function as windings. Thus, when a current flows through the primary winding 200, magnetic flux is formed in an upward direction indicated by an arrow a4 through the secondary winding 300 in a short-circuit state, under the supposition that magnetic flux is formed in a downward direction indicated by an arrow b4 through the primary winding 200. Furthermore, since the tertiary winding 500 is also shorted, magnetic flux is formed in the upward direction indicated by an arrow c4 through the tertiary winding 500. Thus, when a current flows through the primary winding 200 in a normal state, the magnetic flux formed through the primary winding 200 may be offset by the magnetic fluxes formed through the secondary and tertiary windings 300 and 500. Thus, since the entire reactance of the fault current limiter in the normal state has a value close to zero, the reactance has almost no influence on the power system. As such, the tertiary winding 500 and the secondary winding 300 may form magnetic flux in a direction to offset the magnetic flux formed through the primary winding 200. From this point of view, it may be considered that the tertiary winding 500 performs a similar function to the conductor tube in the embodiment of FIG. 4A, 4B or 13.

The second switching devices 520 of the tertiary winding 500, which maintains the on state in the normal state, may be turned off when an abnormal current flows through the power supply path, like the first switching devices 320 of the secondary winding 300.

When the first switching devices 320 of the secondary winding 300 and the second switching devices 520 of the tertiary winding 500 are turned off, the secondary and tertiary windings 500 cannot function as windings. Thus, most of the magnetic flux formed through the primary winding 200 may not be offset, but smoothly flow through the iron core. Therefore, the reactance of the fault current limiter may be significantly increased, and the magnitude of the abnormal current flowing through the power supply path may be considerably reduced.

Desirably, the second switching device 520 may be turned off after the first switching device 320 is turned off. As described above, when the plurality of first switching devices 320 of the secondary winding 300 are turned off, the first switching devices 320 may not be turned off at the same time. Thus, high-voltage stress may be applied to the first switching device 320 which is finally turned off. In the above-described embodiment, however, when the second switching devices 520 are turned off after all of the first switching devices 320 are turned off, even the first switching device 320 which is finally turned off still functions as a winding. Thus, high-voltage stress induced into the first switching device 320 may be prevented or reduced.

Such a configuration is based on the configuration in which the separation piece 410 of the conductor tube 400 is separated from the conductor tube 400 after all of the first switching devices 320 of the secondary winding 300 are turned off, as described in the embodiment of FIGS. 4 to 12.

Furthermore, the second switching devices 520 may be sequentially turned off from the second switching device 520 positioned in the center of the fault current limiter to the second switching device 520 positioned at the edge of the fault current limiter.

Figure 21:
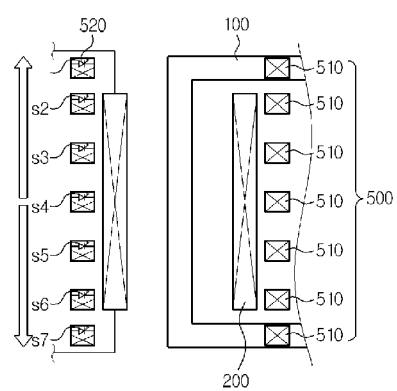
FIG. 21 schematically illustrates the process in which a tertiary winding is opened by switching devices in the fault current limiter of FIGS. 19A and 19B, when an abnormality occurs in a power supply path.

FIG. 21 schematically illustrates the process in which the tertiary winding 500 is opened by the second switching devices 520 in the fault current limiter of FIGS. 19A and 19B, when an abnormality occurs in the power supply path.

In FIG. 21, an arrow indicates the sequence in which the second switching devices 520 provided for the respective unit windings 510 forming the tertiary winding 500 are turned off. As illustrated in FIG. 21, the second switching devices 520 of the respective unit windings 510 of the tertiary winding 500 may be sequentially turned off from the second switching device 520 positioned in the center of one iron core leg 110 to the second switching device 520 positioned at the edge of the iron core leg 110.

More specifically, when an abnormality occurs in the power supply path such that all of the first switching devices 320 of the secondary winding 300 are turned off, the switching devices of the tertiary winding 500 are then turned off. At this time, when the tertiary winding 500 wound around one iron core leg 110 includes 11 unit windings 510 and the second switching devices 520 of the respective unit windings 510 are represented by S1 to S11 as illustrated in FIG. 21, S6 of the second switching device 520 positioned in the center is first turned off. Then, S5 and S7 of the second switching devices 520 are turned off, S4 and S8 of the second switching devices 520 are turned off, and S3, S9, S2 and S10 of the second switching devices 520 are sequentially turned off, and S1 and S11 of the second switching devices 520 are finally turned off.

When the second switching devices 520 are sequentially turned off from the center to the edge, it is possible to prevent the occurrence of back electromotive force and spark during the turn-off operation of the second switching devices 520. This is similar to the principle that back electromotive force and spark do not occur when the separation piece of the conductor tube of the embodiment of FIGS. 18A to 18C is separated downward.

In the embodiment of FIG. 21, the sequence in which the second switching devices 520 of the respective unit windings 510 forming the tertiary winding 500 are turned off has been described. However, such a configuration is only an example, and the present invention is not limited to the turn-off sequence. For example, the second switching devices 520 of the respective unit windings 510 forming the tertiary winding 500 may be turned off in a downward direction from the second switching devices 520 of the unit winding 510 positioned at the uppermost part, or turned off in an upward direction from the second switching device 520 of the unit winding 510 positioned at the lowermost part.

FIG. 21 illustrates only one iron core leg of the fault current limiter of FIGS. 19A and 19B. The configuration may be applied in the same manner to the other two iron core legs.

Desirably, the fault current limiter may further include a control unit configured to control on/off of the first switching devices 320 and/or the second switching devices 520, depending on whether an abnormal current flows through the power supply path. The control unit may control the separation of the separation piece 410.

The fault current limiter may further include an abnormal current sensing unit configured to sense whether an abnormal current such as a fault current flows through the power supply path.

The fault current limiter may further include a warning unit configured to provide warning information to a user, when an abnormal current flows through the power supply path. At this time, the warning unit may include a lamp, a speaker, various display devices and the like.

In the present specification, the terms 'upper' and 'lower' have been used. However, the terms are based on the drawings, and may be changed to the terms 'left' and 'right' or 'lower' and 'upper' depending on positions and angles.

While the present invention has been described with respect to the specific embodiments, it will be apparent to those skilled in the art that various changes and modifications may be made without departing from the spirit and scope of the invention as defined in the following claims.

The invention claimed is:

1. A fault current limiter for limiting a current supplied through a power supply path, comprising:
   an iron core having three legs of which the upper and lower portions are connected to each other;
   a primary winding wound around each of the three legs of the iron core and having both ends connected to the power supply path; and
   a secondary winding wound around each of the three legs of the iron core and having both ends connected to each other through a first switching device; and
   a tertiary winding comprising a plurality of unit windings, and positioned inside or outside the primary or secondary winding so as to be wound around each of the three legs of the iron core,
   wherein each of the unit windings has both ends connected to each other through a second switching device, and
   when an abnormal current flows through the power supply path, the first switching device is turned off, and the second switching device is turned off after the turn-off of the first switching device.

2. The fault current limiter according to claim 1, wherein the secondary winding includes a plurality of unit windings having both ends connected to each other through the respective first switching devices.

3. The fault current limiter according to claim 1, further comprising a conductor tube formed of a conductive material and positioned outside the primary and secondary windings so as to surround the iron core leg.

4. The fault current limiter according to claim 3, wherein the conductor tube comprises a separation piece which is separably attached the conductor tube, and
   when an abnormal current flows through the power supply path, the separation piece is separated from the conductor tube after the turn-off of the first switching device.

5. The fault current limiter according to claim 4, wherein the separation piece is separated in a lateral direction of the conductor tube.

6. The fault current limiter according to claim 5, wherein a part of the conductor tube, which is contacted with the separation piece, has a larger thickness than the other part of the conductor tube.

7. The fault current limiter according to claim 1, further comprising a conductor tube formed of a conductive material, positioned inside the primary and secondary windings so as to surround the iron core leg, and having a lower portion coupled to the iron core through an engagement structure.

8. The fault current limiter according to claim 7, wherein the conductor tube comprises a separation piece which is separably attached the conductor tube, and
   when an abnormal current flows through the power supply path, the separation piece is separated from the conductor tube after the turn-off of the first switching device.

9. The fault current limiter according to claim 1, wherein one or more unit windings among the plurality of unit windings of the tertiary winding pass through the iron core.

10. The fault current limiter according to claim 1, wherein the second switching devices are sequentially turned off from the second switching device positioned in the center of the fault current limiter to the second switching device positioned at the edge of the fault current limiter.

* * * * *